UNITED STATES PATENT OFFICE.

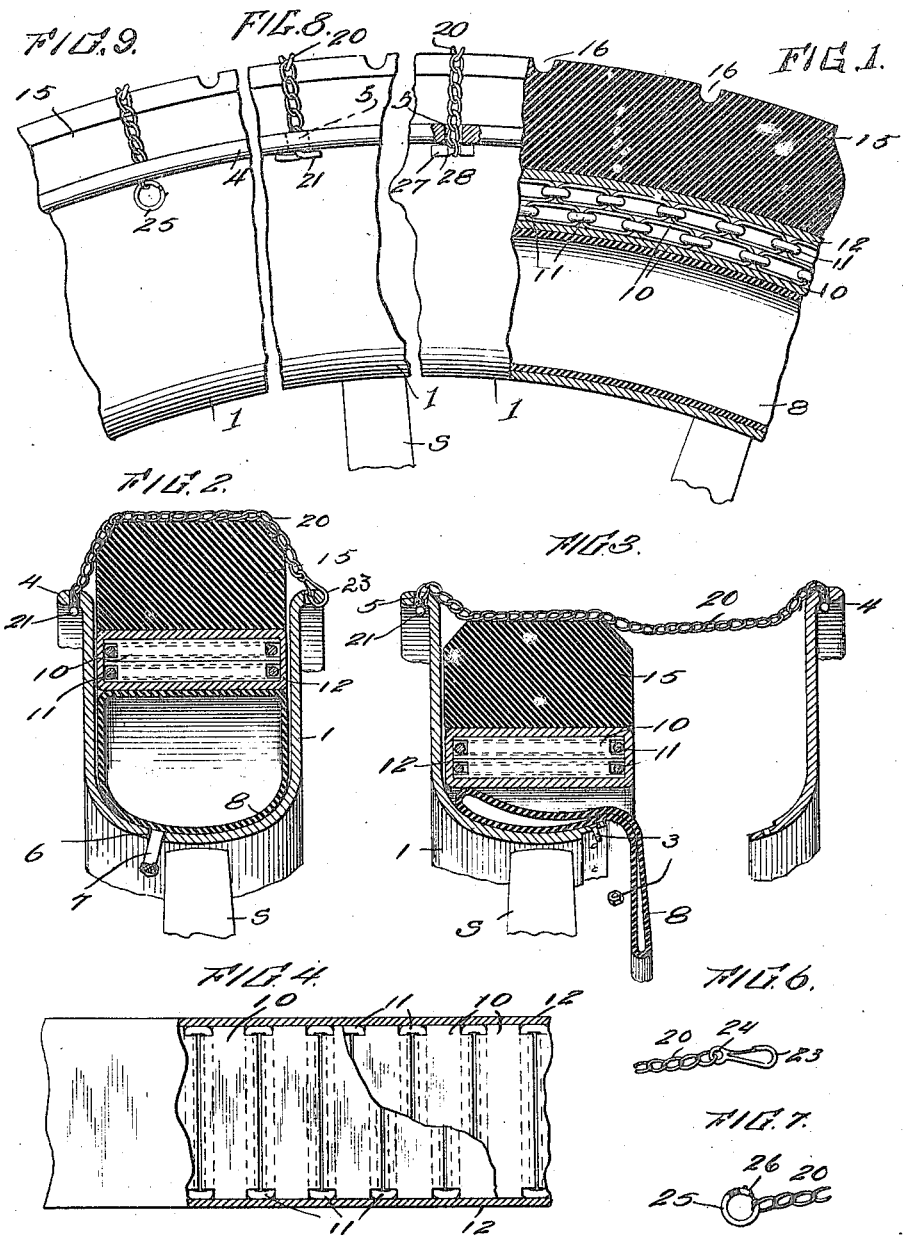

JOSIAH H. HARVEY, OF SCRANTON, PENNSYLVANIA.

TIRE.

1,166,368.　　　　　　Specification of Letters Patent.　　Patented Dec. 28, 1915.

Application filed February 18, 1915. Serial No. 9,146.

*To all whom it may concern:*

Be it known that I, JOSIAH H. HARVEY, a citizen of the United States, residing at Scranton, in the county of Lackawanna and State of Pennsylvania, have invented certain new and useful Improvements in Tires; and I do hereby declare the following to be a full, clear, and exact description of the invention, such as will enable others skilled in the art to which it appertains to make and use the same.

This invention relates to resilient tires, and more especially to pneumatic tires which are armored for protection against puncture either by a tread alone or by a tread and an armor, both overlying the tube.

One object of the invention is to fasten the tire into the rim by cross chains which are loosened when the tube is deflated, and parts of the tire may then be separated as for the insertion of a new tube. In carrying out this object, I sometimes make use of a two-part rim which further assists the insertion and removal of the tube.

Another object is to provide adjustability in the length of the chains, so that they may be taken up when the tread becomes worn.

Still another object is to pass the chains either across the face of the tread so that they will serve as anti-skid members, or along grooves across the outer face of the tread so that the latter will be practically smooth, thereby enabling the user to instantly change his tire from a smooth tread to an anti-skid tread, at his pleasure.

Another object is to keep these chains entirely out of contact with the tube, whereby the latter will not become worn.

Other objects will appear from the following specification which describes my invention in detail, reference being had to the accompanying drawing wherein—

Figure 1 is a side elevation of a portion of this tire, partly broken away to show certain members in section; Fig. 2 is a cross section of this tire, showing it as mounted within a U-shaped rim which in this view is all in one piece; and Fig. 3 is a similar section showing the tire as mounted within a two-part U-shaped rim whose parts are here illustrated as slightly separated, the tube being deflated; Fig. 4 is a plan view, partly broken away, of the armor member. Figs. 5, 6 and 7 are details of different fastening means which may be employed. Figs. 8 and 9 are side elevations of portions of this tire showing slightly different forms of the fastening means described below.

Aside from the rim, this tire comprises four members, viz: the tube, the armor, the tread, and the chains. It is possible in some instances to omit the armor, because the tread is quite thick and in itself will protect the tube from all ordinary punctures. The tire would then consist of but three members, and it will hardly be necessary to illustrate this modification in view of the description which follows.

While I do not wish to be limited to the rim, and have in fact shown it as a single U-shaped member in Fig. 2, I would prefer that it be a two-part rim as shown in Fig. 3, for purposes which will appear below, and in any case I desire that it be rather deep.

I have shown the rim as mounted on the outer ends of the spokes, but it is within the scope of my invention that it could be a detachable or slip-rim mounted on a felly by suitable means forming no part of the present invention. The tube also is that of ordinary daily use, and the tread may be of solid rubber or a rubber composition.

I have described this tire as an automobile tire, and prefer its use as such although I do not wish to be limited in that respect.

Coming now to the details of the present invention as shown in the accompanying drawings, the rim may be of U-shape and in one piece of metal as seen in Fig. 2, or it may be composed of two parts whereof that numbered 1 is fixed to the spokes S, and that numbered 2 (which I would have on the outside of the wheel) is rather smaller than the part 1 and is connected therewith along the inner side of the rim near the spokes by any suitable means such as the bolts indicated by the numeral 3. The outer edges of both parts are turned outward into rather wide beads 4, and as above stated I prefer that the rim be somewhat deep, with its sides substantially parallel. At suitable intervals the beads are pierced with holes 5 directly opposite each other by preference. At some proper point the rim-part 1 is pierced with a hole 6 for the nipple 7 of the air tube 8 which lies in the inner or rounded portion of the rim, and these two members are of such relative size that when the tube is inflated it occupies a little more than half of the entire rim as seen in Fig. 2.

Next outside the tube and within the rim is located the armor member best seen in Fig. 4. This is by preference made up of two chains, each consisting of a series of steel plates 10 connected by links 11, the plates of one chain overlapping the meeting lines between the plates of the other chain so as to break joint therewith, and the whole inclosed within a leather or other flexible casing 12. The relative size of this member should be about that shown in Fig. 2, so that it is a little narrower than the interior of the rim and may move freely outward and inward therein when the tire is in use. The armor rests squarely on the outer face of the tube 8, and is a continuous band extending around the wheel.

The tread 15 is herein shown as of solid rubber, somewhat similar to rubber cushion tires as commonly employed on buggy wheels. I prefer that its inner and outer faces be substantially flat, but the outer face could have its corners beveled off or might in fact be rounded. The sides also should be flat, and the width of this member such that it may pass between the sides of the rim and move freely inward and outward therein when the tire is in use. In Fig. 1 the outer or wear face of this member is shown as provided with a number of cross grooves 16 for a purpose yet to appear. These are typical of anti-skid provisions which might be made for preventing the tire from slipping, and its wear face could be given any desired configuration with this end in view. However, I prefer that at intervals corresponding with the spacing of the holes 5 in the beads 4 cross grooves 16 shall be formed in the wear face of the tread, whatever the shape of that face between such grooves.

The last member of this improved tire is a fastening means for holding the other members within the rim. It is shown as made up of a number of independent chains 20 extending straight across the wear face of the tread as seen at the left of Fig. 1, so that if that face be smooth these chains themselves constitute anti-skid elements; or perhaps extending across through the grooves 16 in the tread if said tread be moved slightly within the rim before the parts are tightened up. In this case the chains would substantially fill said grooves, and the wear face of the tread would contact with the roadway so that the chains would not be pressed into such face, and therefore the tread would not be worn by them. Each end of each chain passes through one of the holes 5 in one of the beads 4, and it is connected with the rim by suitable fastening means whereof several have been illustrated in Figs. 5, 6 and 7. Fig. 5 shows a cross-bar 21 something like an ordinary bit, linked as at 22 to the endmost link of the chain 20, and its dotted position shows how the bar may be turned to pass through the hole 5. Fig. 6 shows a snap hook 23 linked as at 24 to the chain 20, and Fig. 7 shows a ring 25, having a spring-projected tongue 26 detachably engaging one of the links of the chain 20. Perhaps the simplest arrangement is an ordinary pin 27 passed through one of the links near the end of the chain as indicated in Fig. 1, but this pin should have a groove 28 around its body at its mid-length so that the tension of the chain will cause its link to remain within the groove and the pin cannot be lost out. Any of these, or other fastening means may be employed at either or both ends of any chain; and it is quite possible to use a permanent fastening means at one end of each chain, such as the bit or cross-bar 21 shown in Fig. 8, provided some detachable fastening means is employed at the other end of the chain. The snap hook would engage over the edge of the bead 4 with its tongue in the hole 5, and the ring 25 would be fastened through one of the links of the chain after the latter had passed through the hole 5. Some such fastening means as the ring 25 or the pin 27 would permit the adjustment in the length of the chain, even if a permanent device 21 were employed at the other end of the chain, because the ring or the pin could be removed and the chain drawn tighter, and the ring or the pin reinserted through another link. This possibility is illustrated in Fig. 9.

From this description it is obvious that I do not wish to be limited to the style of fastening means employed at either or both ends of the chains, and obviously the latter may be of any suitable type so long as their links are capable of use in the manner herein described. As many chains will be employed as there are pairs of holes 5, or I might use a less number of chains but I could never use a larger number. It might be possible to have non-adjustable fastening means at both ends of the chains if the rim were made in two parts as seen in Fig. 3, but I should prefer that at least one of the fastening devices were removable and especially adjustable for purposes which will appear. Care should be taken to place the holes 5 at such points within the beads 4 that the chains passing from these holes up over the wear face of the tread will not contact with the sides of the latter to its injury.

I have spoken of chains and prefer their use, but it is quite possible that other flexible elements could be substituted, such for instance as metal bands or straps having sufficient resiliency and pierced with perforations for the engagement of the fastening devices.

With the above construction of parts, the assembling of the elements of this tire is as follows:—The deflated tube 8 is laid in the inner portion of the rim, the annular armor is then passed into the rim around the outer side of the tube, and the tread into the rim around the outer side of the armor. Finally the chains are put in place and their ends passed through the holes 5 and connected with whatever type of fastening devices are employed. Then the tube is inflated by pumping air through the nipple 7 in the usual manner, and as it expands it presses the armor outward, which causes the tread to move outward so that the chains are finally put under tension and the parts stand as seen in Fig. 2. When weight is thrown onto the lower part of a tire as thus constructed, the tread pushes inward slightly and moves the armor inward, and the latter compresses the tube slightly, the compression running around the wheel and being distributed as well understood. When the wheel commences to rotate, the chains 20 where they pass over the wear face of the tread contact with the surface of the ground and act as anti-skid elements. But if this be not desired, the tread will have been put into the rim in such manner that its grooves 16 will come beneath the chains 20 so that when the latter are tightened up they lie within the grooves, and thereafter the inflation of the tube 8 will tighten up the chains, but the chains will not project beyond the wear face of the tread. In either case the tread cannot creep, because of the engagement of the chain-links with its wear face. When said face becomes worn, the chains are tightened up by moving the fastening device at one or both ends into the next link, as will be understood. In fact, if it were desired to remove the armor, it might be accomplished successfully without the necessity of replacing it with any other member, by simply tightening the chains to a greater degree, and then the inner face of the tread would lie on the outer face of the tube. Primarily the tread will be so thick radially as to prevent all ordinary nails from passing through it and puncturing the tube; if there is to be no armor member, I would prefer to make the tread yet thicker; but with the parts proportioned about as shown in Fig. 2 and with the armor in use, the tread will take up all short nails and the like, and longer ones will strike the plates 10 of the armor and either be turned aside or broken, but in no event may they pass inward to the tube 8. When this tire reaches obstructions in the roadway or when extra weight is thrown upon it, the tread is pushed farther inward between the sides of the rim at the bottom of the wheel, and the armor compresses the tube considerably at this point.

For the insertion and removal of the tube 8, slightly different steps are necessary with the constructions shown in Figs. 2 and 3. That is to say, if the rim be all in one piece, in order to remove the tube it must first be deflated, then one end of all the chains disconnected from the bead at that side, then the tread is moved over that bead and removed, then the armor likewise moved over that bead and removed, and finally the tube taken out in the same way. But with the construction shown in Fig. 3, it may not be necessary to detach the fastening means. The screws or other devices 3 connecting the two parts 1 and 2 of the rim are now withdrawn, the tube is deflated which permits the armor and the tread to move inward and slacken all chains, then the rim-part 2 is moved bodily outward or away from the spokes S and the other rim-part 1, and finally the tube can be drawn out between the edges of the two rim parts without necessarily removing the armor and the tread from the rim at all. After the tube has been repaired or when a new one is employed, it is passed into the rim in the same manner, the parts thereof re-connected, and finally the tube re-inflated. Obviously the same course would be pursued in withdrawing and removing the tube, if there were no armor. I might say that I prefer the use of the armor or of an exceptionally thick tread so that the outer wall of the tube 8 is spaced from the edges and beads of the rim, and ever held quite remote from the holes 5 or any part of the chains so that no wear on the tube can occur.

I do not wish to be limited to the detailed construction of the parts or elements of this improved tire, and it is quite possible that the tube, tread, armor and chains could all be bought in the open market. Even the fastening means which hold the chains to the rim might be any of those illustrated or others which will answer the same purpose.

This specification merely sets forth one suitable and practical manner of carrying out my invention, and I have illustrated several forms of fastening means which may have possibilities differing from each other but which are all obviously directed to the same end.

What I claim is:

1. A tire construction comprising a U-shaped rim having along its edges outwardly extending beads, a composite tire within said rim including an inflatable tube and a tread, chains passing over said tread, and means for detachably and adjustably connecting them to the beads at points remote from said tube.

2. A tire construction comprising a two-part channeled rim, means for separably connecting its parts, a pneumatic tube within the rim, a shield therein outside said tube, a tread therein outside the shield and adapted to be projected partly beyond the rim by the inflation of said tube, the wear-face of the tread having spaced cross grooves; and a series of chains passing over said tread and spaced to correspond with the spacing of said grooves, said chains being connected with the rim-parts and of a length to permit the separation of said parts when the tube is deflated, whereby the latter may be removed.

3. A tire construction comprising a two-part channeled rim, means for separately connecting its parts, a pneumatic tube within the rim, a tread therein outside said tube and adapted to be projected partly beyond the rim by the inflation of said tube; and a series of chains passing over said tread and connected with the rim-parts and of a length to permit the separation of said parts when the tube is deflated, whereby the latter may be removed.

4. A tire construction comprising a two-part channeled rim having out-turned beads along its edges, means for separably connecting its parts, a pneumatic tube within the rim, a tread therein outside said tube and adapted to be projected partly beyond the rim by the inflation of such tube, shielding means between the tube and tread, and a series of chains passing over said tread and connected with the beads and of a length to permit the separation of said rim-parts when the tube is deflated, whereby the shield and tube may be removed without removing the tread and chains.

5. The combination with a channeled-rim, a pneumatic tube seated in the inner portion thereof, and chains connecting points in the walls of said rim and longer than the distance between said points, the latter being remote from said tube; of a shield around the tube and standing within the rim, and a thick tread around the shield and adapted to be projected part way from it by the inflation of the tube, the wear-face of said tread having cross grooves corresponding with the spacing of said chains.

6. The combination with a channeled-rim, a pneumatic tube seated in the inner portion thereof, and chains connecting points in the walls of said rim and longer than the distance between said points, the latter being remote from said tube; of a tread around the tube within the rim and adapted to be projected part way from it by the inflation of the tube, the wear-face of said tread having cross grooves corresponding with the spacing of said chains.

7. A tire construction comprising a U-shaped rim, a pneumatic tube located in the lower portion of said rim, a solid tread of less width than the rim located in the upper portion of said rim, a plurality of separate chains extending over said tread and having the ends thereof extending alongside the tread and secured to the rim, and a flexible shield between the pneumatic tube and the solid tread, said shield being of substantially the same width as the tread and located in the rim below the ends of the chains.

8. A tire construction comprising a rim, a bead extending outwardly from the edge of each side of the rim, a tire located within the rim, a plurality of separate chains extending over the tire, the ends of the chains extending through openings formed in the bead at substantially opposite points therein, and pins engaging links of the chains and adapted to lie under the beads.

9. A tire construction comprising a U-shaped rim, a pneumatic tube located in the bottom of said rim, a solid tire located in the upper part of said rim, and a plurality of separate chains, the ends of which are connected to the rim, the pneumatic tube being removed from the ends of the chains.

10. A tire construction comprising a U-shaped rim, a pneumatic tube located in the inner portion of said rim, a solid tire located in the outer portion of said rim, separate chains extending over said solid tire, the ends of the chains being secured to the rim, and flexible shielding means located between the chains and the pneumatic tube.

11. A tire construction comprising a U-shaped rim, a composite tire including an inflatable tube and a tread, and separate chains passing over said tread and having their ends connected to the rim, whereby when the tube is deflated the composite tire may be placed in and removed from the rim by detaching the chains.

12. A tire construction comprising a channeled rim, a series of equally spaced chains connected at one end with one edge of the rim, and means for detachably and adjustably connecting them to the other edge of the rim; combined with a pneumatic tube located in the lower portion of the rim, and a solid tread located in the rim around said tube and expansible radially when the tube is inflated, the outer face of the tread having transverse grooves spaced equally with the chains and into which or between which they may be selectively disposed, for the purpose set forth.

In testimony whereof I affix my signature in presence of two witnesses.

JOSIAH H. HARVEY.

Witnesses:
JAMES MOIR,
O. M. HAMLIN.